UNITED STATES PATENT OFFICE.

JAMES H. JOHNSON, OF NEW ORLEANS, LOUISIANA; M. Y. JOHNSON, ADMINISTRATOR OF SAID JAMES H. JOHNSON, DECEASED.

IMPROVEMENT IN PROCESSES FOR RENDERING CORDAGE UNINFLAMMABLE.

Specification forming part of Letters Patent No. 7,797, dated November 26, 1850.

*To all whom it may concern:*

Be it known that I, JAMES H. JOHNSON, of the city of New Orleans, in the State of Louisiana, have invented a new and useful Process of Rendering Vegetable Fibrous Substances Uninflammable; and I do hereby declare that the following is a full and exact description thereof.

My process of rendering vegetable fibrous substances uninflammable or fire-proof is as follows:

In a vessel or vat I place water and saturate it with any of the neutral salts or alkaline preparations by treating it with peroxide of manganese, muriate of soda, and sulphuric acid in the proportions ordinarily used for generating chlorine, and when the chlorine ceases to come off from the saturated watery solution I then immerse the cordage and allow it to remain for a sufficiently long time to be perfectly saturated with the salts contained in the solution. The fiber, being allowed to remain until it is thoroughly saturated, is then taken out and dried, and is then found to be uninflammable. To preserve this uninflammable condition of the said vegetable fibrous substance, I subject it to the following additional process of treatment, viz: In a vat or vessel containing a solution of bichloride of mercury I place a sufficient quantity of gelatinous matter to render it about the consistency of cream or thin varnish, in which preparation I place the said fibrous substance and allow it to remain a sufficient length of time to become thoroughly saturated and coated, and then remove and dry it.

What I claim as my invention, and desire to secure by Letters Patent, is—

My improved process of rendering vegetable fibrous substances uninflammable and preserving them in that condition, substantially as herein set forth.

JAMES H. JOHNSON.

Witnesses:
Z. C. ROBBINS,
H. H. YOUNG.